US006549441B1

(12) United States Patent
Aigner et al.

(10) Patent No.: US 6,549,441 B1
(45) Date of Patent: *Apr. 15, 2003

(54) VOLTAGE SWITCH-OVER DEVICE (75) Inventors: Hubert Aigner, Taufkirchen/Trattnach (AT); Alfred Hiesmayr, Sattledt (AT); Friedrich Oberzaucher, Wels (AT); Walter Pammer, Bad Hall (AT)

(73) Assignee: Fronius Schweissmaschinen Produktion GmbH & Co, KG, Pettenbach (AT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/831,584
(22) PCT Filed: Nov. 4, 1999
(86) PCT No.: PCT/AT99/00263
§ 371 (c)(1),
(2), (4) Date: May 11, 2001
(87) PCT Pub. No.: WO00/30241
PCT Pub. Date: May 25, 2000

(30) Foreign Application Priority Data

Nov. 12, 1998 (AT) .............................................. 1891/98

(51) Int. Cl.[7] ................................................ H02M 1/10
(52) U.S. Cl. ..................... 363/142; 363/71; 219/130.21; 219/137 PS
(58) Field of Search .......................... 363/17, 98, 124, 363/132, 71, 65, 142, 143; 219/130.21, 137 PS (56) References Cited

U.S. PATENT DOCUMENTS 3,846,695 A   11/1974  Genuit et al.
5,119,283 A * 6/1992  Steigerwald et al. ........ 323/207
5,272,313 A   12/1993 Karino et al.
5,771,163 A   6/1998  Moriguchi et al.
5,894,214 A * 4/1999  Jiang ........................ 323/222
5,930,122 A * 7/1999  Moriguchi et al. ........... 363/17
6,023,416 A * 2/2000  Shikata et al. .............. 363/134
6,369,548 B1 * 4/2002 Oberzaucher et al. ...... 320/166

FOREIGN PATENT DOCUMENTS

DE    41 12 907    4/1992
DE    34 41 631    2/1993
DE    44 30 394    1/1995
DE    43 05 768    11/1995

OTHER PUBLICATIONS

JP 09093930, Japanese Abstract 07242969, Sep. 21, 1995.

* cited by examiner

Primary Examiner—Michael Sherry
Assistant Examiner—Gary L. Laxton
(74) Attorney, Agent, or Firm—Collard & Roe, P.C.

(57) ABSTRACT

The invention relates to a voltage switching device (23) consisting of a power rectifier (26), a boost chopper (34, 35) having at least one storage element (50, 51), a transformer (40), a switching device (59), a control device (4) and a plurality of mains leads (27 to 29), the power rectifier (26) being connected to an energy source (24) by the mains leads (27 to 29) and a consumer (25) with a secondary winding (42) of the transformer (40), a power evaluating device (32) supplied with voltage from the energy source (24) being provided, the output of which is connected to the switching device (59) or to the control device (4). A boost chopper (34, 35) is provided respectively in a positive and a negative supply line (30, 31) from the power rectifier (26), the storage elements (50, 51) provided in the boost choppers (34, 35) each being connected independently of one another to a respective high frequency inverter (36, 37), the high frequency inverters (36, 37) being connected respectively to a primary winding (38, 39) of one or more transformers (40).

18 Claims, 2 Drawing Sheets

VOLTAGE SWITCH-OVER DEVICE

CROSS REFERENCE TO RELATED APPLICATIONS

Applicants claim priority under 35 U.S.C. §119 of Austrian Application No. A 1891/98, filed on Nov. 12, 1998. Applicants also claim priority under 35 U.S.C. §365 of PCT/AT99/00263, filed on Nov. 4, 1999. The international application under PCT article 21(2) was not published in English.

BACKGROUND OF THE INVENTION

1. Field of the Invention

The invention relates to a voltage switching device.

2. Description of the Prior Art

A voltage switching device is also known from DE-C1 41 12 907, having voltage doubling circuits with two symmetrical circuit halves with switching options for the two operating states in the form of a power switch for incoming alternating voltage and two boost choppers essentially in symmetrical mirror image, one being disposed in each of the two symmetrical circuit halves of the voltage doubling circuit. Again, the disadvantage of this arrangement is that the two storage elements of the boost choppers are directly connected to one another and again form a capacitive midpoint.

Voltage switching devices are also known which are used for activating switches for different powers. To this end, the voltage switching device is designed so that a separate switch group is provided for every possible voltage rating, in particular for 230 V and 400 V voltages, and once the delivered voltage has been evaluated a switching device switches to the corresponding switch group. The individual switch groups consists of a power rectifier and a storage element, for example.

The individual switch groups provided for the different voltages are connected in parallel with one another and a corresponding switch group is activated by a corresponding switching device. The disadvantage of this arrangement is that the individual switch groups have to be dimensioned separately from one another and the fact of having to use different components means that the cost of voltage switching devices of this type is relatively high.

The underlying objective of the present invention is to provide a voltage switching device which is capable of switching in a simple manner from one energy source with a corresponding voltage to another energy source with a different voltage.

This object is achieved by the invention with a voltage switching device comprising a power rectifier connected to a positive supply line and a negative supply line, a booster chopper arranged in each supply line, each booster chopper comprising a choke, a switching element, a diode and a storage element, at least one transformer having a primary winding and a secondary winding, and a switching device for switching the boost choppers in series or in parallel, depending on a voltage delivered by an energy source. The switching elements have inputs connected to a control device, and a plurality of mains leads connect the power rectifier to the energy source. A consumer is connected to the secondary winding of the transformer, a power evaluating device evaluates the value of the voltage delivered by the energy source. The power elvaulating device has an output connected to the switching device or the control device, a high frequency inverter is independently connected to each storage element, and each high frequency inverter is connected to the primary winding of the transformer.

The advantage of this arrangement is that because of the layout of the boost choppers, the flow of energy to the storage elements can be made symmetrical by controlling the boost choppers, thereby offering a simple approach to preventing a non-symmetrical supply of the downstream high frequency inverter. Another advantage resides in the fact that the use of boost choppers in the voltage switching device obviates the need for a capacitive voltage midpoint resulting from parallel or serial switching of the storage elements.

BRIEF DESCRIPTION OF THE DRAWING

The invention will be described in more detail below with reference to the embodiments illustrated as examples in the drawings.

Of these.

DETAILED DESCRIPTION OF THE PREFERRED EMBODIMENTS

Figure 1:
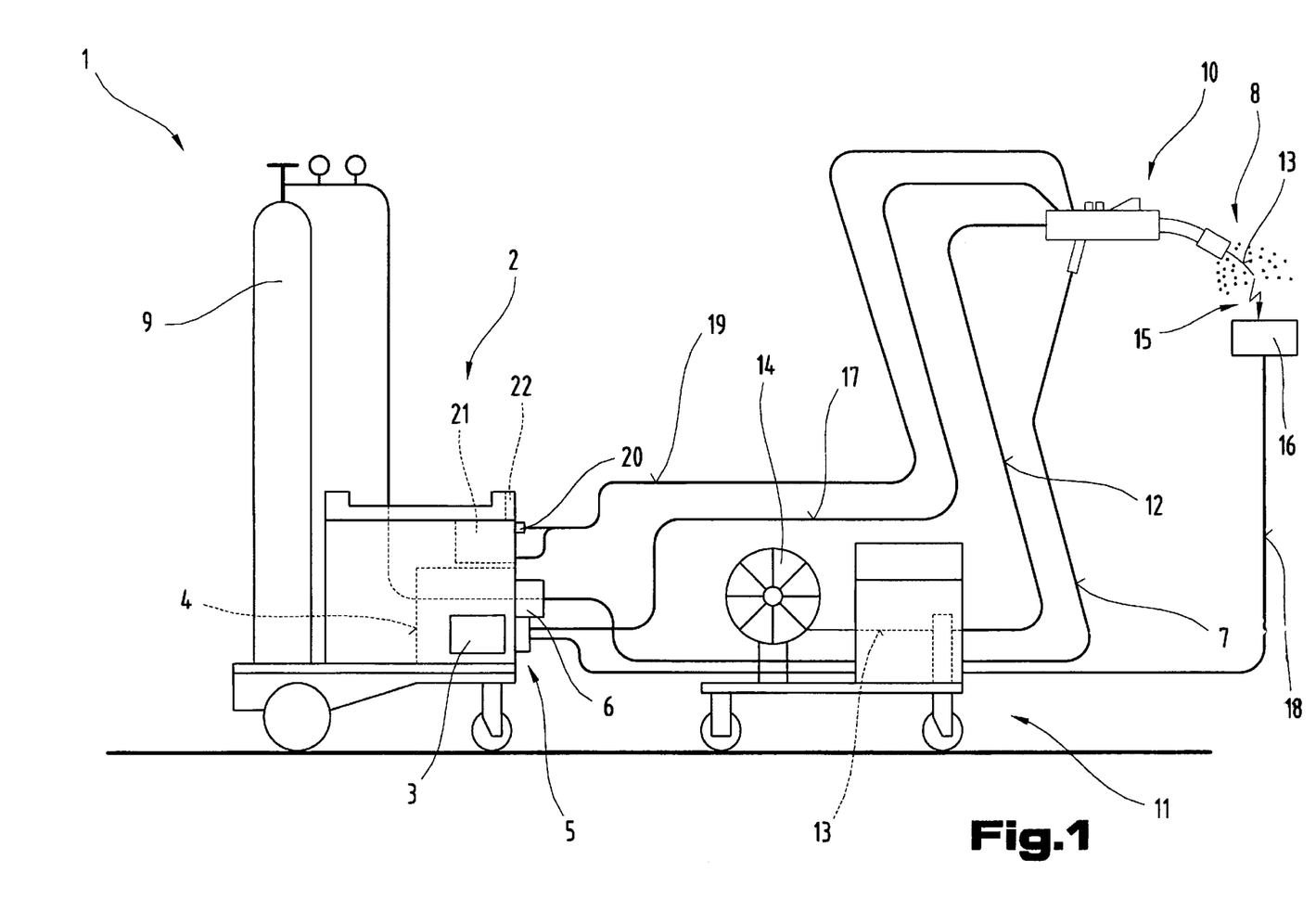
FIG. 1 is a simplified diagram of a schematic structure of a welding device.

FIG. 1 shows a welding device 1 for performing a whole range of welding processes, e.g. MIG/MAG welding or TIG welding or electrode welding processes.

The welding device 1 comprises a power source 2 with a power component 3, a control device 4 and a switching member 5 co-operating with the power component 3 or the control device 4. The switching member 5 or the control device 4 is connected to a control valve 6 which co-operates with a delivery line 7 for a gas 8, in particular an inert gas, such as $CO_2$, helium or argon and similar, running between a gas storage 9 and a welding torch 10.

A wire feed device 11 of the standard type used in MIG/MAG welding, for example, may also be activated via the control device 4, so that a welding wire 13 is fed from a supply drum 14 to the region of the welding torch 10 via a delivery line 12. The current needed to strike an arc 15 between the welding wire 13 and a workpiece 16 is fed via a supply line 17 from the power component 3 of the power source 2 to the welding torch 10 or welding wire 13, the workpiece 16 to be welded also being connected to the welding device 1 via another supply line 18 so that a circuit can be set up by means of the arc 15.

In order to cool the welding torch 10, a water container 21 may be connected to the welding torch 10 via a coolant circuit 19, having a flow indicator 20 connected in between, and when the welding torch 10 is switched on, the coolant circuit 19 is activated by the control device 4, thereby cooling the welding torch 10 or the welding wire 13.

The welding device 1 also has an input and/or output device 22, by means of which a whole range of welding parameters or operation types of the welding device 1 can be set. The welding parameters entered in the input and/or output device 22 arc forwarded to the control device 4, from where the individual components of the welding device 1 are activated.

Clearly, instead of connecting the welding torch 10 to the individual components, in particular the welding device 1 or wire feed device 11, by individual lines as in the embodiment illustrated as an example here, it would also be possible to incorporate these individual lines in a common hose pack which is then connected to the welding torch 10.

Figure 2:
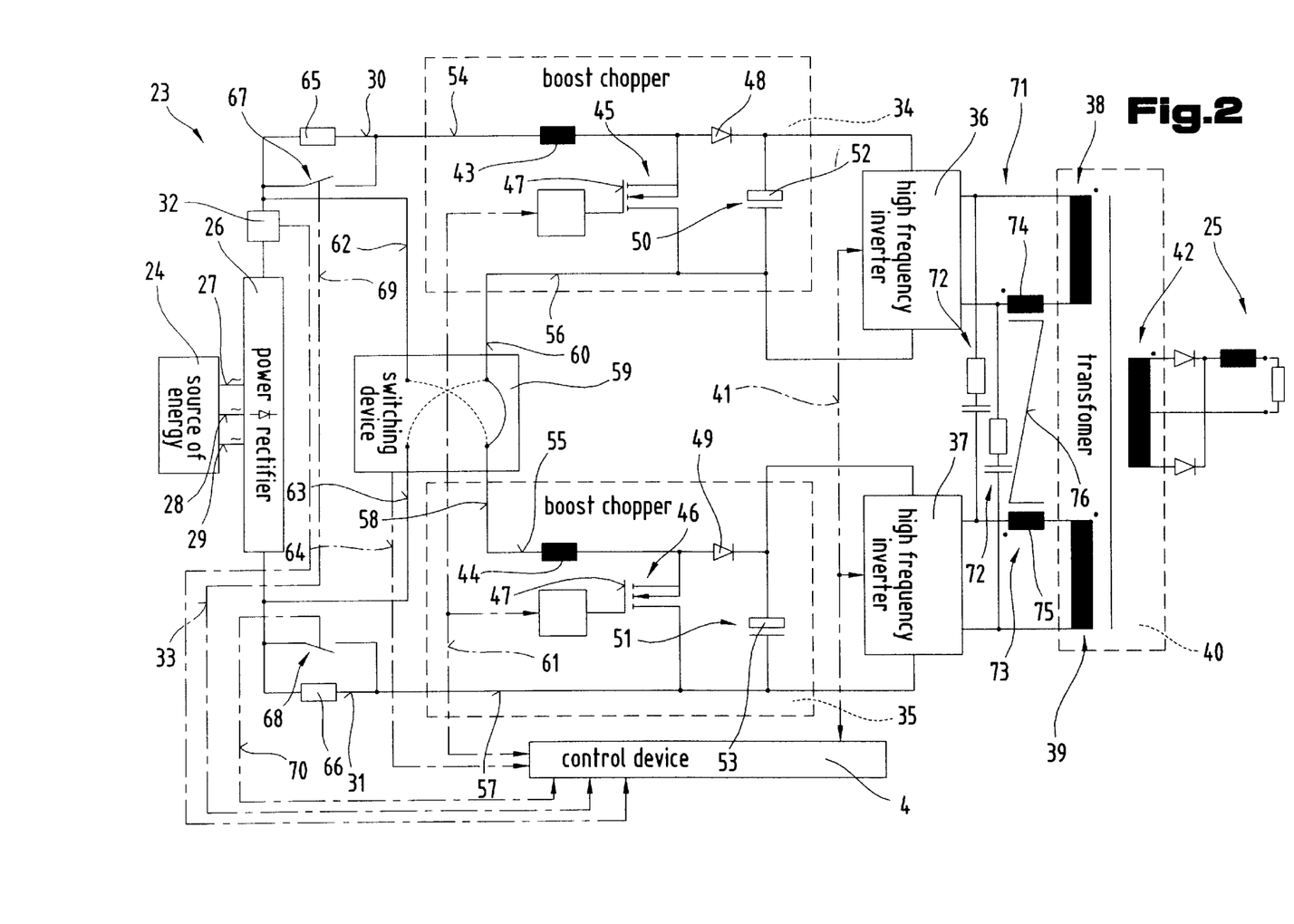
FIG. 2 is a simplified illustration showing a block diagram of a voltage switching device as proposed by the invention.

FIG. 2 is a block diagram of a voltage switching device 23 for the welding device 1. The voltage switching device 23 may, of course, be used for any electrical or electronic tool or control system.

The purpose of the voltage switching device 23 is to determine the voltage delivered by an energy source 24, in particular the rating of the voltage, and to supply a consumer 25, such as the control device 4, the power component 3, etc., with a corresponding constant voltage. Accordingly, the voltage switching device 23 can be connected to different energy sources 24 with different voltage ratings, in particular input voltages.

To this end, the voltage switching device 23 has a power rectifier 26, which is connected via mains leads 27 to 29 to the energy source 24, which may be the mains network, for example. The energy supplied by the energy source 24, in particular an alternating voltage, is converted into direct energy, in particular direct voltage, by the power rectifier 26, the outputs of the power rectifier 26 being connected to a positive supply line 30 at which the positive potential of the direct voltage lies and a negative supply line 31 at which the negative potential of the direct voltage lies.

At one of the two outputs of the power rectifier 26, in particular in the positive supply line, a power evaluating device 32 is provided in series with the power rectifier 26. The purpose of the power evaluating device 32 is to detect the energy fed by the power rectifier 26 to the positive/negative supply line 30, 31, in particular the rating of the delivered voltage, and then to forward it via a control line 33 connected to the output of the network evaluating device 32 on to the control device 4 of the welding device 1. Clearly, it would also be possible to connect the network evaluating device 32 before the power rectifier 26 so that the level of the input voltage from the energy source 24 can be detected in the alternating voltage circuit between the energy source 24 and the power rectifier 26.

The voltage switching device 23 also has at least two boost choppers 34, 35, a boost chopper 34, 35 being disposed respectively in the positive and negative supply lines 30, 31 of the power rectifier 26, i.e. at least one input or one output of the boost choppers 34, 35 is connected to the positive or negative supply lines 30, 31.

Each of the two boost choppers 34, 35 are then connected to a high frequency inverter 36, 37, each of the high frequency inverters 36, 37 being in turn connected to a primary winding 38, 39 of a transformer 40. The high frequency inverters 36, 37 may be provided as a full bridge, half bridge, etc., for example, in which case, whereby if a full bridge is used, for example, it will consist of a plurality of switching elements, in particular transistors, in a manner known per se. The individual switching elements or high frequency inverter are controlled so that the individual inputs of the switching elements are connected to the control device 4 via a control line 41. The function of the individual high frequency inverters 36, 37 will not be explained in any further detail since any method of controlling a full bridge, for example, may be used, in particular the high frequency inverters 36, 37.

On this point, it merely needs to be said that the control device 4 activates the individual switching elements in pairs via the control line 41 so that an alternating voltage is applied via the high frequency inverters 36, 37 to the primary windings 38, 39. This is necessary insofar as the energy supplied by the power rectifier 26 is converted into direct voltage so that this direct voltage is in turn converted into an alternating voltage, in particular into a square-wave voltage so that, because of the change in current flow, in particular due to the alternating voltage or square-wave voltage, due to the individual primary windings 38, 39, energy can be transferred to the secondary side of the transformer 40, thereby enabling energy for the consumer 25 to be supplied by a secondary winding 42 arranged on the secondary side. This energy transfer via the transformer 40 is of advantage because the consumer 25 is galvanically separated from the voltage switching device 23 or the energy source 24.

The consumer 25 may be any known consumer 25, such as a computer, a battery charger, a solar unit, a programmable logic controller, a current source, etc., a resistance being used to schematically denote the consumer 25, which is connected to the secondary winding 42 across a midpoint circuit by means of a two-way rectifier circuit.

If using the embodiment with boost choppers 34, 35 in the voltage switching device 23, any boost choppers 34, 35 known from the prior art may be used. Clearly, it would also be possible for the control device 4 to use or operate any known method of controlling or regulating the individual boost choppers 34, 35. In the embodiment illustrated as an example here, the two boost choppers 34, 35 consist respectively of a choke 43, 44, a switching element 45, 46, in particular a transistor 47, a diode 48, 49 and a storage element 50, 51, in particular a capacitor 52, 53. The two boost choppers 34, 35 each have a positive line 54, 55 and a negative line 56, 57, the chokes 43, 44 and the diodes 48, 49 being respectively arranged in series in the positive line 54, 55. Connected respectively between the chokes 43, 44 and the diodes 48, 49 is the switching element 45, 46, connected respectively to the positive and negative line 54, 56 and 55, 57, so that when the switching elements 45, 46 are activated the positive and negative lines 54 to 57 can be connected to one another or shorted across the switching element 45, 46. Arranged parallel with the switching elements 45, 46, with the diodes 48, 49 connected in between, are the storage elements 50, 51, the storage elements 50, 51 being in turn connected to the positive and negative lines 54 to 57.

A layout of the type described above is known from the prior art and the way the individual components or parts co-operate with one another will therefore not be explained in any further detail. It is merely pointed out as a matter of principle that a boot chopper 34, 35 of this type will produce a short circuit between the positive and negative lines 54 to 57 when the switching elements 45, 46 are activated, as a result of which energy is stored in the chokes 43, 44, which is then discharged across the diodes 48, 49 to the storage elements 50, 51 or via the transformer 40 to the consumer 25 when the switching elements 45, 46 are de-activated.

The two boost choppers 34, 35 are disposed in the voltage switching device 23 so that the choke 43 of the boost chopper 34 is connected to the positive supply line 30 whilst the choke 44 of the other boost chopper 35 is connected via a connecting line 58 to an input of a switching device 59. The negative line 56 of the first boost chopper 34 is in turn connected via a connecting line 60 to the switching device 59, whilst the negative line 57 of the other boost chopper 35 is connected to the negative supply line 31 of the power rectifier 26. So that the individual boost choppers 34, 35 can be controlled by the control device 4, the switching elements 45, 46, in particular the inputs thereof, are connected to the control device 4 by means of a control line 61. To this end, an appropriate control device for switching elements 45, 46 known from the prior art may be provided before the switching elements 45, 46 to convert the delivered signal into an appropriate signal for the switching element 45, 46.

Accordingly, the two inputs of the switching elements 45, 46 or the control device can be connected to one another, these inputs then being connected to the control device 4 by means of the control line 61. Connecting the two switching elements 45. 46 together will ensure that the two boost choppers 34, 35 will run in parallel. Clearly, it would also be possible for each of the individual switching elements 45, 46 to be connected to the control device 4 by a separate control line 61, which would enable the individual boost choppers 34, 35 to be activated or controlled independently of one another.

The switching device 59 connected to the boost choppers 34, 35 is arranged in parallel with the power rectifier 26, i.e. they are connected to the positive and negative supply lines 30, 31 of the power rectifier via other inputs of the switching device 59 by means of other connecting lines 62, 63, in other words the switching device 59 is arranged in the voltage switching device 23 parallel with the power rectifier 26 and simultaneously connected via the supply lines 58 and 60 to the boost choppers 34, 35.

In order for the control device 4 to be able to control the switching device 59, a control input of the switching device 59 is connected to the control device 4 by means of a control line 64. This being the case, the control device 4 has the option of placing the switching device 59 into a range of switching states by issuing a control signal across the control line 64. These switching states in the switching device 59 are indicated by broken lines and solid lines. The switching device 59 may be provided in the form of a relay or electronic components such as transistors, etc., but care must be taken to ensure that the different switching states can be operated. Furthermore, instead of controlling or regulating the switching device 59 directly through the control device 4, it would also be possible to do this via the power evaluating device 32, i.e. the power evaluating device 32 is connected to the control input of the switching device 59 so that when a control signal is issued by the network evaluating device 32 a corresponding state is produced in the switching device 59. The individual states of the switching device 59 will be explained in more detail as part of the description of how the voltage switching device 23 operates.

Because the two boost choppers 34, 35 are arranged in the voltage switching device 23, it will be necessary to switch through to charging resistors 65, 66 the first time the device is operated. These charging resistors 65, 66 are arranged in series in the positive and negative supply line 30, 31 from the power rectifier 26 to the boost choppers 34, 35. It is necessary to provide or integrate the charging resistors 65, 66 the first time the voltage switching device 23 is activated because the two storage elements 50, 51 produce a short circuit between the positive and negative lines 54 to 57, which is however prevented by the charging resistors 65, 66, i.e. when the voltage switching device 23 is activated, in other words when operating voltage is applied, the storage elements 50, 51 forming the intermediate circuit capacitor produce a short circuit between the two lines 54, 56 and 55, 57, which would give rise to a considerable intake of power from the energy source 24.

However, the charging resistors 65, 66 are provided in the positive and negative supply lines 30, 31 in order to avoid having to rate the other components for such a high power intake. Another advantage of providing charging resistors 65, 66 is that a constant power intake from the energy source 24 is generated, thereby enhancing the charging cycle for the individual storage elements 50, 51.

However, to enable the charging resistors 65, 66 to be switched out of the current circuit of the positive and negative supply lines 30, 31, a respective bypass switch 67, 68 is arranged in parallel with the charging resistors 65, 66. The purpose of the bypass switch 67, 68 is to switch the charging resistors 65, 66 out of the current circuit, once a pre-settable time has elapsed or once the storage elements 50, 51 have been appropriately charged, by short-circuiting the charging resistors 65, 66. To this end, the bypass switches 67, 68 are connected to the control device 4 by means of control lines 69, 70. The bypass switches 67, 68 may be provided in the form of an electronically controlled normally closed or normally open contact, a relay or other switching elements, such as a transistor, for example.

The charging resistors 65, 66 can be switched in and out in such a way that when the voltage switching device 23 is brought into operation, in other words when an operating voltage is applied, the charging resistors 65, 66 are already connected into the current circuit by using an electronically controlled normally closed contact. The energy supplied by the energy source 24 is converted into direct voltage by the power rectifier 26, and then applied to the positive and negative supply line 30, 31 and hence supplied to the boost choppers 34, 35 via the charging resistors 65, 66. However, if a normally open contact is used as a bypass switch 67, 68 in the voltage switching device, a signal must be transmitted across the control lines 69, 70 when the voltage switching device is turned on so that the bypass switches 67, 68 are opened and hence remove the short circuit across the charging resistors 65. 66.

At the same time as the voltage switching device 23 is activated, the control device 4 initiates a timing function, for example, i.e. once this pre-settable timing function has elapsed, in particular the timed period, the control device 4 sends out a signal to the control lines 69, 70, whereupon the bypass switches 67, 68 are closed and the charging resistors 65, 66 short circuited as a result.

If a device, in particular a welding device 1, built into the voltage switching device 23 is activated, i.e. this device is connected to a mains supply, in particular the energy the energy source 24, the user will be able to power the welding device 1 by means of a duly provided on-switch. To this end, alternating voltage is delivered from the energy source 24 to the power rectifier 26.

The layout of the voltage switching device 23 is such that the user can connect a device of this type to different energy sources 24 with different output voltages, i.e. this device, in particular the welding device 1, can be connected to an energy source 24 with a voltage of 220 V—three-phase network—for example or to an energy source 24 with a voltage of 400 V—three phase network—for example. To do this, the user does not need to enter any settings or make any adjustments in the conventional manner since the voltage switching device 23 adapts automatically to the different voltages, in particular to 220 V or 400 V.

Once the device or the consumer 25 has been activated, for example by operating the on-switch, the alternating voltage supplied by the power rectifier 26 is converted into direct voltage. The power rectifier 26 is rated so that it can be connected to an input voltage of both 220 V for example and an input voltage of 400 V for example. The power rectifier 26 may be of any design, i.e. both a bridge rectifier and individual diodes may be used to convert the alternating voltage into direct voltage. The individual components provided in the device, in particular the welding device I, will be supplied with energy from the power rectifier 26, i.e. both the control device 4 and any other components will be supplied with their requisite operating voltage of 5–12 V for example. This can be operated by connecting a known mains device for supplying electronic components in parallel with the power rectifier 26 and/or in parallel with the storage elements 50, 51, in particular the intermediate circuit capacitor, so that the supplied energy can be converted into an operating voltage for the components.

Using the bypass switches 67, 68 as normally closed contacts prevents a short circuit due to the storage elements 50, 51 when the voltage switching device 23 is activated because the charging resistors 65, 66 are connected into the current circuit, as explained above. At the same time as the voltage switching device 23 is activated, the level of the direct voltage supplied by the power rectifier 26 is detected by the power evaluating device 32 so that a signal can be sent across the control line 33 to the control device 4 corresponding to the level of the direct voltage ascertained or detected. For example, in the case of a voltage corresponding to an input voltage of 220 V, no signal will be sent via the control line 33 to the control device 4, so that the latter will know that an input voltage of 220 V will follow. If, on the other hand, an energy source 24 is used in which the alternating voltage supplied is 440 V, a signal is sent by the network evaluating device 32 to the control device 4. Accordingly, the control device 4 is able to detect or evaluate the most varied of input voltages from the energy source 24. Clearly, the voltage switching device 23 may be designed to handle several different energy sources 24, such as a 110 V supply, 220 V supply or a 400 V supply, the different input voltages or supplies being detected sending different signals to the control device 4.

To ensure that the voltage switching device 23 operates reliably, the switching device 59 may be designed so that in the non-operating position, in other words when the switching device 59 is not activated, the switching state is set to the higher input voltage, in particular the position illustrated by solid lines, and when the voltage switching device 23 is switched on, the charging cycle is initiated, at least for a brief time, as a result of being switched to the higher voltage, i.e. the two storage elements 50, 51 are serially connected by the switching device 59.

Due to the signal supplied by the power evaluating device 32, the switching device 59 will be activated accordingly by the control device 4, i.e. the switching device 59 will set a corresponding switching state depending on the transmitted signal. To this end, the switching state illustrated by broken lines is initiated by the switching device 59 if the power is a 220 V supply whereas the switching state illustrated by solid lines will be initiated by the switching device 59 if the power is a 400 V supply.

The operating sequence of the voltage switching device 23 when using an energy source 24 with a voltage rating of 220 V will now be described, i.e. how the switching device 59 applies or uses the switching state illustrated by broken lines after detecting the input voltage.

Immediately or as the operating voltage for the individual components or component units is applied, the control device 4 starts a pre-settable timed period. This timed period may be programmed by an external timer or by a software programme. During this timed period, the charging cycle for the storage elements 50. 51 is operated across the charging resistors 65, 66. When an input voltage of 220 V is applied to the voltage switching device 23, the two storage elements 50, 51 are charged in parallel due to the change in switching state in the switching device 59, in other words due to the switching state illustrated by broken lines. This being the case, a separate respective current circuit is established between the power rectifier 26 and the individual storage elements 50, 51, at least one charging resistor 65, 66 being disposed in each current circuit. The current circuit for the storage element 50 is established from the power rectifier 26 across the charging resistor 65, the choke 43, the diode 48 to the storage element 50 and from there via the connecting line 60, the switching device 59 and the other connecting line 63 to the power rectifier 26. The other current circuit for the storage element 51 is established from the power rectifier 26 across the connecting line 62, the switching device 59, the other connecting line 58, the choke 44 and the diode 49 to the storage element 51 and from there across the negative line 57, the negative supply line 31 and the charging resistor 66 to the power rectifier 26.

Clearly, the charging cycle for the storage elements 50, 51 may also be operated when switched to the state for the higher input voltage, in which case the control device 4 will not activate the switching device 59 until the pre-settable timed period has elapsed so that the switching device 59 adjusts the switch state to the input voltage. As a result, the two storage elements 50, 51 are connected in series with one another and only one current circuit is set up in the voltage switching device 23 for the two storage elements 50, 51.

A monitoring device may be provided in the voltage switching device 23 to monitor the charging cycle of the storage elements 50, 51, in which case this monitoring device will send a signal to the control device 4 terminating the charging cycle when a set desired value is reached.

Once the timed period of the charging cycle has elapsed, another pre-settable safety period is initiated by the control device 4. Simultaneously with or during the safety period, the two by-pass switches 67, 68 are activated by the control device 4 so that the charging resistors 65, 66 are short circuited and switched out of the current circuit of the power rectifier 26. The purpose of the timed safety period is to ensure that the bypass switches 67, 68 are closed before activating the two boost choppers 34, 35, thereby preventing any interference with the charging resistors 65, 66 due to an increased current intake. The advantage of operating a timed safety period is that the charging resistors 65, 66 can be of a low rating, thereby saving on cost. Clearly, if higher rated charging resistors 65, 66 were used, it would also be possible to omit this timed safety period from the control procedure.

Once the timed safety period has elapsed, the switching device 59 activates the two boost choppers 34, 35 arranged in the voltage switching device 23. The operating principle of the boost choppers 34, 35 corresponds to a known method, i.e. when the switching elements 45, 46 in the boost choppers 34, 35 are activated, a short circuit is produced between the positive and negative lines 54, 56 and 55, 57 of the boost choppers 34, 35. Accordingly, a current circuit is established respectively via the individual boost choppers 34, 35 with the power rectifier 26. The current across the two boost choppers 34, 35 is set up in independent circuits because they are connected to the power rectifier 26 in parallel via the switching device 59.

The current circuit for the boost chopper 34 is established across the bypass element 67, the choke 43 and the switching element 45 to the negative line 56 and from there across the switching device 59 and the connecting line 63 to the negative supply line 31 and hence to the power rectifier 26. The other current circuit for the boost chopper 35 is established starting from the power rectifier 26 via the connecting line 62 and the switching device 59 and from there via the connecting line 58, the choke 44 and the switching element 46 to the negative supply line 31 and hence to the power rectifier 26. By means of the two independent current circuits, energy is stored in the chokes 43, 44 so that when the switching elements 45, 46 are deactivated, this stored energy is able to flow across the diodes 48, 49 to the storage elements 50, 51. Since the control device 4 has not yet activated the two high frequency inverters 36, 37, no energy is supplied to the transformer 40, enabling the storage elements 50, 51 to be pre-charged with energy stored by the chokes 43, 44. This procedure of activating or short-circuiting the individual boost choppers 34, 35 via the switching elements 45, 46 is continued by the control device 4 until the storage elements 50, 51 have been correctly pre-charged. It would also be possible for the control device 4 to activate the two high frequency inverters 36, 37 simultaneously with the boost choppers 34, 35, in which case energy would be applied to the consumer 25 immediately.

Since the high frequency inverters 36, 37 are full bridges having appropriate switching elements 45, 46 of a known type, the primary windings 38, 39 of the transformer 40 may be supplied with energy from the boost choppers 34, 35 when the high frequency inverters 36, 37 are activated by the control line 41. Using high frequency inverters 36, 37 means that the individual switching elements 45, 46 in the high frequency inverters 36, 37 can be activating by a timing system and alternating voltage can be applied to the primary windings 38, 39, i.e. the direct voltage supplied by the boost choppers 34, 35, in particular the storage elements 50, 51, can be chopped in such a way that an alternating voltage, in particular a square-wave voltage is formed.

This is necessary because the consumer 25 is connected to the high frequency inverters 36, 37 via the transformer 40 in a galvanically separate arrangement and, as known from the prior art, an alternating voltage is needed to transfer energy across a transformer 40 since if a direct voltage were applied, the transformer 40 would otherwise make a one-off voltage transfer and then reach saturation, at which point no more voltage would be transferred. By reversing the current flow or by applying alternating voltage, in particular square-wave voltage, energy is constantly transferred from the primary side, in other words from the primary windings 38, 39, to the secondary winding 42, thereby enabling the consumer 25 to be supplied with energy.

As with the embodiments illustrated as examples here, it would also be possible for the secondary winding 42 to be connected to consumer 25, which will then have to be supplied with direct voltage. To this end, as schematically illustrated, a midpoint circuit could be set up with the secondary winding 42 so that the alternating voltage transferred, in particular the square-wave voltage, is in turn converted into direct voltage, thereby making the appropriate rectified power available to the consumer 25.

If the voltage switching device 23 is used in conjunction with a welding device 1, the welding torch 10 may be connected to the secondary winding 42, i.e. the arc 15 needed for a welding process can be struck by supplying the welding torch 10 with energy from the voltage switching device 23. Any other known consumer 25 or any other rectifier circuit may be connected to the secondary winding 42.

In order to be able to transfer energy constantly across the transformer 40, the control device 4 must activate the boost choppers 34, 35 and the high frequency inverters 36, 37, in particular their switching elements 45, 46, via the individual control lines 61, 41, as described above.

If using an energy source 24 with an output voltage of 220 V, the two boost choppers 34, 35 are operated in parallel with one another so that a constant, synchronised energy flow can be generated for the primary winding 38 and the for the primary winding 39. This is achieved by activating the individual switching elements 45, 46 or the activating device of the boost choppers 34, 35 via a common control line 61, thereby producing synchronised parallel operation of the boost choppers 34, 35, which therefore apply the same quantity of energy to the storage elements 50, 51.

Using a layout of this type with the two boost choppers 34, 35 operating in parallel, the chokes 43, 44 may be magnetically coupled by means of a common core. Clearly, the individual chokes 43, 44 could each have a separate core.

If the device, in particular the welding device 1, with the voltage switching device 23 arranged in it is connected to another energy source 24, in particular an energy source 24 with an output voltage of 400 V, when the device is activated the charging resistors 65, 66 are firstly connected into the current circuit of the power rectifier 26, as described above. However, since a higher output voltage is now delivered by the power rectifier 26, a signal can be sent by the power evaluating device 32 to the control device 4. On the basis of this signal, the control device 4 is able to detect that the voltage switching device 23 is connected to an energy source 24 with an output voltage of 400 V, for example, which means that the control device 4 will not now change the switch state of the switching device 59.

The switching device 59 maintains the switching state, in particular the switching state illustrated by solid lines. As a result, the two boost choppers 34, 35 are no longer connected via the connecting line 62, 63 to the positive and negative supply lines 30, 31 of the power rectifier 26 and instead the two boost choppers 34, 35 are connected to one another in series via the connecting lines 60, 58 with the switching device 59 connected in between. The two boost choppers 34, 35 are connected in series due to the fact that the negative line 56 of the boost chopper 34 is coupled via the switching device 59 and the connecting line 58 to the positive line 55 of the boost chopper 35.

As described above, the charging cycle for the storage elements 50, 51 is run when an input voltage of 400 V, for example, is applied to the voltage switching device 23 but because of the basic set-up used, in other words the switch position illustrated by solid lines, the storage elements 50, 51 are charged by only one current circuit since the two storage elements 50, 51 are connected in series. As a result, the direct voltage applied to the two storage elements 50, 51 is split, thereby producing the same charging state as that produced if the storage elements 50, 51 are charged in parallel. However, the two charging resistors 65, 66 for the two storage elements 50, 51 are incorporated for the purposes of the charging cycle.

Once the charging cycle or the preset timed period of the charging cycle and the timed safety period has ended, the two switching elements 45, 46 of the boost choppers 34, 35 and/or the switching elements of the high frequency inverters 36, 37 are activated by the control device 4 so that a short circuit is again produced in the individual boost choppers 34, 35 between their positive and negative lines 54, 56 and 55, 57. However, since the two boost choppers 34, 35 are now connected to one another in series, only one current circuit is established with the power rectifier 26 in the voltage switching device 23 across the two boost choppers 34, 35. This current circuit is established from the power rectifier 26 via the bypass switch 67, the choke 43 and the switching element 45 to the switching device 59 and from there across the choke 44, the switching element 46, the negative supply line 31 and the bypass switch 68 to the power rectifier 26.

As a result, because the power rectifier 26 is supplying a higher output voltage, this output voltage or the quantity of energy supplied is divided between the two chokes 43, 44. By deactivating the two switching elements 45, 46 the divided, stored energy is in turn fed from the chokes 43, 44 across the diodes 48, 49 to the storage elements 50, 51. Since the energy supplied by the power rectifier is halved or divided, the quantity of energy or voltage in turn applied to the storage elements 50, 51 is the same is it would be if using an energy source 24 with an output voltage of 220 V. A 400 V energy source 24 is controlled by the same operating sequence as that used with a 220 V energy source 24, i.e. the boost choppers 34, 35 and the high frequency inverters 36, 37 connected to one another in series, in particular their switching elements 45, 46, are activated by the control device 4 via the control line 41, 61 but once the pre-settable time period has elapsed the charging resistors 65, 66 are switched out of the power circuit of the power rectifier 26.

The significant advantage gained by using a voltage switching device 23 of this type resides in the fact that by connecting the two boost choppers 34, 35 in series, the increased amount of energy supplied by the power rectifier 26 is halved and the quantity of energy or voltage applied to the storage elements 50, 51 is the same as it would be if using a power supply with a lower output voltage of 220 V. Accordingly, the components connected downstream of the storage elements 50, 51, such as the high frequency inverters 36, 37, the transformer 40 and the components arranged on the secondary side of the transformer 40, in particular the consumer 25, need only be rated for 220 V, for example, thereby obviating the need for higher rated components and reducing costs significantly.

As a result of using a voltage switching device 23 of this type, no capacitive voltage midpoint is produced since the storage elements 50, 51, in particular the capacitors 52, 53, are made symmetrical in any event by controlling the boost choppers 34, 35. In known voltage switching devices 23, the storage elements arranged therein, in particular intermediate circuit capacitors, are connected to one another directly in parallel or in series to handle the different input voltages from the energy sources 24 so that the high frequency inverters 36, 37 subsequently switched into the system are connected to a capacitive voltage midpoint. The solution proposed by the invention avoids this capacitive voltage midpoint.

Control of the two high frequency inverters 36, 37 is particularly important in ensuring that the voltage switching device 23 proposed by the invention operates the storage elements 50, 51, in particular the so-called intermediate circuit capacitors, symmetrically. To this end, the two high frequency inverters 36, 37 may be activated or controlled by the control device 4 independently of one another so that power shunting or non-symmetrical energy intake can be prevented.

The design of the transformer 40 also affects the symmetry of the storage elements 50, 51. For example, it would also be possible to use two magnetically independent transformers 40, separately connected in parallel on the secondary side, or, as illustrated, a transformer 40 with two coupled primary windings 38, 39. The two chokes 43, 44 of the boost choppers 34, 35 may be either separate or magnetically coupled by means of a common core. Clearly, the switching device 59 may be built using known plug contacts, in which case the user of the device, in particular the welding device 1, would have to manually switch to the appropriate state before using it. A voltage switching device 23 of this type could also be used for single-phase supplies.

The voltage switching device 23 proposed by the invention also has a balancing aid 71 for supplying the two primary windings 38, 39. The balancing aid 71 is provided in the form of an RC-member 72 on the one hand and a balanced transformer 73 on the other. The layout of the balancing aid 71 is important insofar as it produces a passive charging balance between the two primary windings 38, 39, i.e. if the supply to the two primary windings 38, 39 differs, it balances out the charge, in particular half of the voltage difference, so that the energy supplied to the transformer 40, in particular the two primary windings 38, 39, is always symmetrical.

The purpose of using an RC-member 72 is that when the voltage switching device is running on idle, in particular when the consumer 25 is not activated, small voltage differences can be compensated by charging the capacitors of the RC-members 72. To this end, a separate RC-member 72 is provided respectively between one respective line of the one primary winding 38 and one respective line of the other primary winding 39. However, care needs to be taken with regard to the coil direction of the individual primary windings 38, 39 so that the wire connected at the coil start, illustrated by a dot, of the primary winding 38 is connected is connected to the line of the other primary winding 39 at the start of the coil via the RC-member 72. The other lines of the two primary windings 38, 39 are in turn connected to one another by an RC-member 72 of the same type.

The purpose of using the additional balancing aid 71, namely the balanced transformer 73, is that if a higher current or more energy is transferred across the transformer 40, the energy can be balanced and, in balancing the energy, the balanced transformer 73 is slightly assisted in this by the RC-members. To enable the balanced transformer 73 to fulfil this energy compensating function, it has a respective balancing winding 74, 75 for each primary winding 38, 39, which is magnetically coupled via a common core 76. A respective balancing winding 74, 75 of the balanced transformer 73 is connected in series with one of the two primary windings 38, 39 respectively and again, care needs to be taken with regard to the coil direction of the individual windings, in particular the primary windings 38, 39 and the balancing windings 74, 75. If the balancing windings 74, 75 of the balanced transformer 73 are wound in the same direction, a balancing winding 74, for example, must be arranged at the coil end of the primary winding 38 and the other balancing winding 75 at the coil start of the primary winding 39 or vice versa. If the two balancing windings 74, 75 are wound in different directions, the two balancing windings 74, 75 may be connected respectively at the coil start or at the coil end of the primary windings 38, 39.

Another advantage of using the balanced transformer 73 is that energy is exchanged between the two primary windings 38, 39 but energy can now be exchanged at a higher rate. During the exchange of energy, half of the excess energy at one of the two primary windings 38, 39 is transferred to the other primary winding 38, 39, ensuring that operation of the transformer 40 is balanced when using different power ratings. However, this balancing aid 71 is only active at higher power transfers, i.e. when the consumer is being supplied 25, in other words not when running idle, the energy is balanced by the balanced transformer 73.

A significant advantage of providing the balancing aid 71 is that the balancing aid 71 prevents any imbalance in the supply to the primary windings 38, 39 which might arise due to the tolerances of the components. Providing the balancing aid 71 and the boost choppers 34, 35 also means that power fluctuations from the energy source 24 will not affect the balance of the transformer 40. Another advantage of the voltage switching device 23 proposed by the invention is that the power factor is improved and the intake of mains power reduced, simultaneously reducing power distortions or ripples.

Clearly, if using a voltage switching device 23 of this type, it would also be possible to omit passive charge balancing by the balancing aid 71, in particular the RC-members 72 and the balanced transformer 75. However, in order to ensure that the transformer 40 is balanced in operation, it will be necessary to balance the charging process actively, in which case active charge balancing will be operated by an appropriate regulating method.

For the sake of good order, it should finally be pointed out that in order to provide a clearer understanding of the invention, it and its constituent parts have been illustrated out of scale and out of proportion.

Furthermore, individual features from the individual examples of embodiments may be combined with other individual features from other examples or embodiments or may be used alone as independent aspects of the invention.

Above all, the embodiments illustrated in FIGS. 1; 2 can be construed as independent solutions proposed by the invention. The tasks and solutions can be found in the detailed descriptions relating to these drawings.

| Reference Numbers |
|---|
| 1 Welding device |
| 2 Power source |
| 3 Power component |
| 4 Control device |
| 5 Switching member |
| 6 Control valve |
| 7 Delivery line |
| 8 Gas |
| 9 Gas storage |
| 10 Welding torch |
| 11 Wire feed device |
| 12 Delivery line |
| 13 Welding wire |
| 14 Supply drum |
| 15 Arc |
| 16 Workpiece |
| 17 Supply line |
| 18 Supply line |
| 19 Coolant circuit |
| 20 Flow indicator |
| 21 Water container |
| 22 Input and/or output device |
| 23 Voltage switching device |
| 24 Energy source |
| 25 Consumer |
| 26 Power rectifier |
| 27 Mains lead |
| 28 Mains lead |
| 29 Mains lead |
| 30 Positive supply line |
| 31 Negative supply line |
| 32 Power evaluating device |
| 33 Control line |
| 34 Boost chopper |
| 35 Boost chopper |
| 36 High frequency inverter |
| 37 High frequency inverter |
| 38 Primary winding |
| 39 Primary winding |
| 40 Transformer |
| 41 Control line |
| 42 Secondary winding |
| 43 Choke |
| 44 Choke |

| -continued |
|---|
| Reference Numbers |
| 45 Switching element |
| 46 Switching element |
| 47 Transistor |
| 48 Diode |
| 49 Diode |
| 50 Storage element |
| 51 Storage element |
| 52 Capacitor |
| 53 Capacitor |
| 54 Positive line |
| 55 Positive line |
| 56 Negative line |
| 57 Negative line |
| 58 Connecting line |
| 59 Switching device |
| 60 Connecting line |
| 61 Control line |
| 62 Connecting line |
| 63 Connecting line |
| 64 Control line |
| 65 Charging resistors |
| 66 Charging resistors |
| 67 Bypass switch |
| 68 Bypass switch |
| 69 Control line |
| 70 Control line |
| 71 Balancing aid |
| 72 RC-member |
| 73 Balanced transformer |
| 74 Balancing winding |
| 75 Balancing winding |
| 76 Core |

What is claimed is:

1. A voltage switching device comprising
  (a) a power rectifier connected to a positive supply line and a negative supply line,
  (b) a boost chopper arranged in each supply line, each boost chopper comprising a choke, a switching element, a diode and a storage element,
  (c) at least one transformer having a primary winding and a secondary winding,
  (d) a switching device for switching the boost choppers in series or in parallel, depending on a voltage delivered by an energy source,
  (e) a control device, the switching elements having inputs connected to the control device for controlling the boost choppers,
  (f) a plurality of mains leads connecting the power rectifier to the energy source,
  (g) a consumer connected to the secondary winding of the transformer,
  (h) a power evaluating device for evaluating the value of the voltage delivered by the energy source, the power evaluating device having an output connected to the switching device or the control device, and
  (i) a high frequency inverter independently connected to each storage element, and each high frequency inverter being connected to the primary winding of the transformer.

2. The voltage switching device of claim 1, wherein each high frequency inverter is comprised of a full bridge having a plurality of switching elements.

3. The voltage switching device of claim 1, further comprising a connecting line connecting the switching elements of the boost choppers, a control line connecting said connecting line to the control device.

4. The voltage switching device of claim 1, wherein the switching device is arranged in parallel to the power rectifier, and connecting lines connect the positive and negative supply lines to the switching device.

5. The voltage switching device of claim 1, further comprising a connecting line connecting each boost chopper to the switching device.

6. The voltage switching device of claim 1, wherein the switching device switches the boost chopper arranged in the positive supply line through a connecting line to the negative supply line when an input voltage is low.

7. The voltage switching device of claim 1, wherein the switching device switches the boost chopper arranged in the negative supply line through the connecting line to the positive supply line when the input voltage is low.

8. The voltage switching device of claim 1, further comprising connecting lines connecting the switching device to the positive and negative supply lines, the switching device connecting the boost choppers and deactivating the connecting lines when an input voltage is high.

9. The voltage switching device of claim 1, further comprising a charging resistor arranged in each supply line connected to the power rectifier.

10. The voltage switching device of claim 9, further comprising a bypass switch arranged in parallel with each charging resistor.

11. The voltage switching device of claim 1, wherein each boost chopper has a positive line connected to the positive supply line and a negative line connected to the negative supply line, the choke and the diode being arranged in the positive line, the switching element being connected to the positive and negative lines between the choke and the diode, and the storage element being connected in parallel to the positive and negative lines through the diode.

12. The voltage switching device of claim 11, wherein the choke of one of the boost choppers is connected to the positive supply line.

13. The voltage switching device of claim 12, wherein a connecting line connects the choke of the other boost chopper to the switching device.

14. The voltage switching device of claim 1, further comprising a balancing aid arranged between the high frequency inverters and the primary winding of the transformer.

15. The voltage switching device of claim 14, wherein the balancing aid is comprised of an RC-member and a balanced transformer.

16. The voltage switching device of claim 15, wherein the RC-member is arranged between the primary windings.

17. The voltage switching device of claim 15, wherein the balanced transformer is comprised of two balanced windings magnetically coupled by a common core.

18. The voltage switching device of claim 17, wherein the balanced windings are connected in series to the primary windings.

* * * * *